United States Patent [19]
Buchtel

[11] 3,784,058
[45] Jan. 8, 1974

[54] DISPENSER

[75] Inventor: Dean H. Buchtel, Canton, Ohio

[73] Assignee: NuCon, Inc., Canton, Ohio

[22] Filed: Nov. 29, 1971

[21] Appl. No.: 202,905

[52] U.S. Cl............................ 222/57, 4/227, 222/464
[51] Int. Cl............................................... E03d 9/03
[58] Field of Search...................... 4/222, 227, 228; 222/57, 182, 185, 204, 416, 464

[56] References Cited
UNITED STATES PATENTS

| | | | |
|---|---|---|---|
| 1,728,737 | 9/1929 | Stoner | 4/227 |
| 1,213,978 | 1/1917 | Thornton | 4/227 |
| 3,073,488 | 1/1963 | Komter | 222/394 |
| 607,818 | 7/1898 | Ashburner | 4/227 |

FOREIGN PATENTS OR APPLICATIONS

| | | | |
|---|---|---|---|
| 333,699 | 7/1929 | Great Britain | 4/227 |

Primary Examiner—Robert B. Reeves
Assistant Examiner—Larry Martin
Attorney—Vern L. Oldham et al.

[57] ABSTRACT

A device for dispensing a measured quantity of first liquid into a body of a second liquid as the second liguid falls and rises. A container for the first liquid has a dispensing nozzle which includes a small orifice. The nozzle is at the lower most point of the container which is otherwise closed. A U-shaped passage extends from the orifice to an opening within the container adjacent the lowest point thereof. The opposite side of the orifice communicates with an open-bottomed chamber. As the second body of liquid rises air entrapped in the open-bottom chamber is forced through the orifice and U-shaped passage and into the container. When the second body of liquid subsequently drops a controlled quantity of the first liquid is drawn out of the container.

4 Claims, 6 Drawing Figures

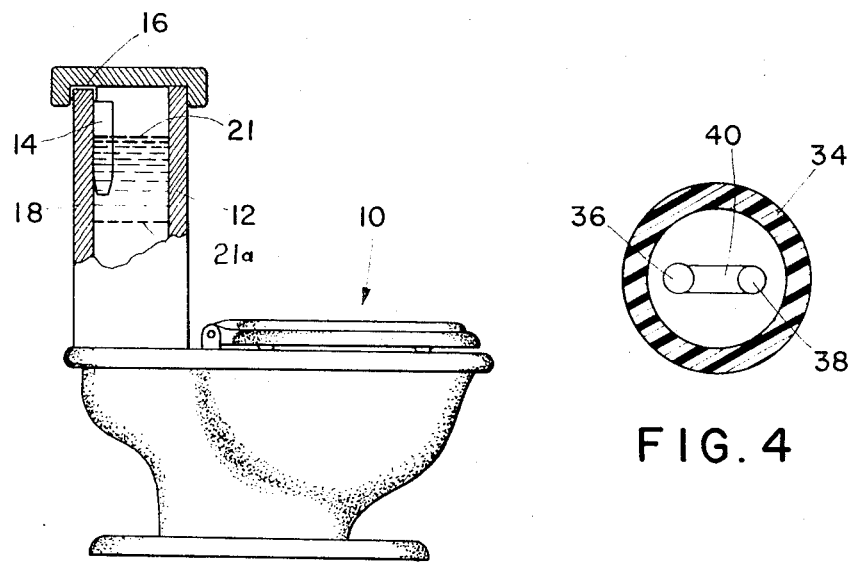
FIG. 4
FIG. 1
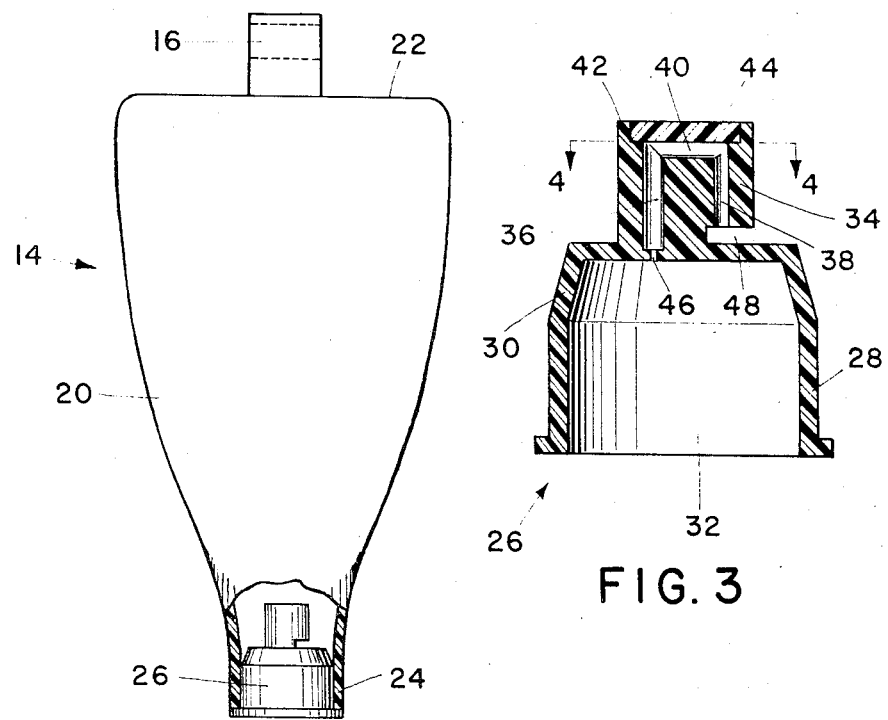
FIG. 3
FIG. 2

3,784,058

DISPENSER

The present invention relates to apparatus for dispensing a small measured quantity of a liquid and, more particularly, to apparatus for dispensing a controlled quantity of first liquid into a second liquid which apparatus is actuated by the rising and falling of the level of the second liquid.

One of the primary uses of such dispensing apparatus is the dispensing of a quantity of deodorizing and/or disinfecting liquid into the water in the flush tank of a toilet. It will be understood, however, that while the embodiment of the invention described herein is intended for such use, the invention is not limited to that particular use but may be used in any situation where controlled dispensing is desired and where the liquid is to be dispensed into a second liquid whose level rises and falls.

Various liquid dispensers for dispensing small quantities of first liquid into a second liquid have been proposed heretofore. However, these earlier dispensers have a number of serious disadvantages. Among the earlier dispensers are those which use diaphragms to obtain the dispensing action. Such dispensers, however, must be provided with check valves which may become blocked or otherwise damaged so that the dispenser does not function properly. Also, the necessity of providing the diaphragm and the valves substantially increases the cost of the dispenser unit. When the dispenser is intended for use with a deodorizing or disinfecting solution this added cost is a major disadvantage since, preferably, the dispenser is a throw away package which may be replaced in its entirety when the quantity of fluid contained within the dispenser is exhausted.

Other dispensers have relied on a siphoning action to achieve the desired controlled dispensing. These dispensers require a reservoir separate from the main body of the disinfecting or deodorizing fluid so that only a controlled quantity is dispensed with each cycle of operation. Again, this arrangement increases the complexity and cost of the dispensing unit.

It is the primary object of the present invention to provide a liquid dispenser which will automatically dispense a controlled quantity of the first liquid into a second liquid and which accomplishes this result without the necessity of diaphragms, valves, or other moving parts.

It is also an object of the present invention to provide a dispenser which may be of simple and inexpensive construction, making it feasable to package the entire dispenser as a throw away item.

A further object of the invention is the provision of such a dispenser which eliminates the need for separate measuring reservoirs.

The above and other objects of the invention which will become apparent in the following detailed description are achieved by providing a dispenser which consists essentially of a bottle having a nozzle assembly and an orifice in the nozzle assembly, a U-shaped passage communicating with the orifice and extending to the lowest point of the bottle, and an open bottomed chamber also communicating with the orifice and positioned so as to have its lower end beneath the surface of the second body of fluid when this body of fluid is at its upper level and to have its lower end exposed to the atmosphere when the second body of fluid drops to a lower level.

For a more complete understanding of the invention and the objects and advantages thereof reference should be had to the following detailed discription and the accompanying drawings wherein there is shown a preferred embodiment of the invention.

In the drawing:

FIG. 1 is a side elevational view of a toilet equipped with a dispenser of the present invention, portions of the structure being broken away to show the location of the dispenser;

FIG. 2 is a front elevational view of the dispenser of the present invention, a portion of the dispenser bottle being broken away for clarity;

FIG. 3 is a transverse sectional view of the dispensing nozzle of the container of FIG. 2;

FIG. 4 is a sectional view taken along the line 4—4 of FIG. 3;

Figure 5:
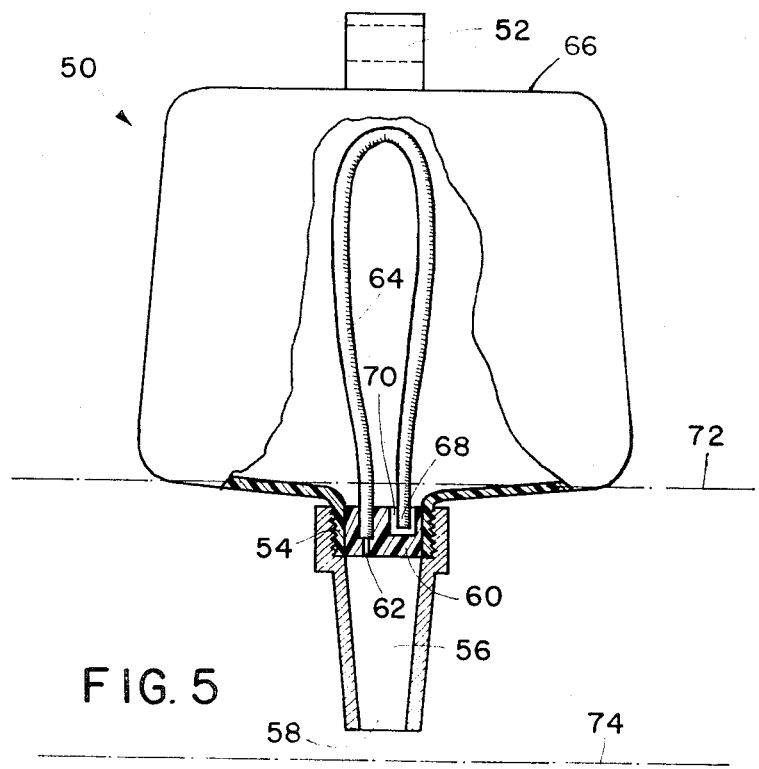
FIG. 5 is an elevational view, partially ensectioned, of a second embodiment of the dispenser of the present invention.

Referring first to FIG. 1 there is shown a toilet designated generally by the reference numeral 10. The toilet 10 is a conventional construction and includes a tank 12 which holds a quantity of water which, upon release, serves to flush the toilet. In order to inject a quantity of deodorizing and/or disinfecting fluid into the water of the tank 12, the dispensing apparatus 14 of the present invention is mounted within the tank 12, preferably by means of a strap 16 which engages one of the walls 18 of the tank. The dispenser 14 is located within the tank so that the water level 21 in the tank at least partially covers the dispenser at its upper level while falling completely free of the dispenser when at its lower level 21a. As will be more clearly understood below, the dispenser 14 operates to dispense a measured quantity of the liquid contained therein each time the water within the tank 12 falls to the level 21a and returns to the upper level 21.

The dispensing apparatus 14 is illustrated in greater detail in FIGS. 2–4. The fluid to be dispensed is contained within a bottle 20. The hook 16 is attached to the bottle 20 so that the closed end 22 of the bottle is uppermost when the bottle is suspended in its operative position. The open end 24 of the bottle receives a dispensing nozzle assembly 26, illustrated in FIGS. 3 and 4 and described in detail below. It should be understood that, with the exception of the dispensing nozzle 26, the bottle 20 is a closed container.

The dispensing nozzle 26 has a cylindrical portion 28 which has a tight fit with the opening 24 of the bottle 20. Immediately above the cylindrical portion 28 the walls of the nozzle 26 may taper inwardly slightly, as indicated at 30, so that the nozzle may be inserted into the end of the bottle. The outer diameter of the cylindrical portion 28 of the nozzle 26 and the inner diameter of the opening 24 of the bottle 20 are such that a fluid-tight seal is formed between the bottle and the nozzle. An adhesive coating or other sealing compound may be provided on the mating surfaces of the nozzle and the bottle, if necessary, to assure that a fluid-tight seal exists. The walls 28 and 30 of the nozzle 26 define an open bottomed chamber 32. Projecting upwardly from the chamber 30 and within the confines of the bottle 20 is an upper portion 34 of the nozzle. This portion is provided with bores 36 and 38 and a cross bore 40 connecting the two bores 36 and 38 to provide a U-shaped passage. Preferably, to facilitate manufacture of the nozzle 26, a larger bore 40 is provided extending downwardly from the upper end of the portion 34 to permit the bores 36 and 38 to be formed as well as to permit the cross bore 40 to be formed. A suitable plug 44 seals the upper bore 40 after the formation of the passages 36, 38, and 40. A small diameter orifice 46 connects the lower end of the bore 36 to the open end of the bore 32 while a slot 48 connects the lower end of the bore 38 to the interior of the bottle 20.

A suitable cap or other sealing member (not shown), may be placed in the bore 32 to seal the container for shipment and storage. This sealing member is, of course, removed before the dispenser is placed in operation.

Assuming that there is a quantity of fluid within the bottle 20 and that the level of the water within the tank 12 is below the lower end of the nozzle, the operation of the dispensing apparatus of the present invention will be briefly described. As the water level rises to its upper level 21 air is trapped within the open bottom chamber 32 by the rising water and is subsequently forced through the orifice 46 and the U-shaped passage consisting of the bores 36 and 38 and the cross bore 40 into the interior of the bottle 20. As the water level drops, for example, upon flushing of the toilet, from its upper level suction is created by the falling water level so that fluid from within the bottle 20 is drawn through the U-shaped passage and the orifice 46. The amount of fluid withdrawn depends on the diameter of the orifice 46. After the water level has dropped below the lower edge of the nozzle 32 pressure equilization takes place and no further liquid is dispensed. Subsequent rising of the water level conditions the dispenser for the next dispensing cycle.

A second embodiment of the invention is illustrated in FIG. 5. In this embodiment the dispenser assembly includes a bottle or container 50 which is provided with a suitable strap 52 for hanging the bottle in an inverted position. Threaded to the opening 54 of the bottle is an elongated spout or tubular member 56 which is open at its lower end and provided at its upper end with a plug or nozzle member 60. A small diameter orifice 62 extends through the plug and communicates with a U-shaped tube 64 which extends upwardly to nearly the opposite end 66 of the bottle and downwardly with its open end 68 being received within a well 70 in the plug 60. A removable cap, plug, or other sealing member (not shown) can be provided for shipping and storage. For example, a removable washer may be placed between the nozzle 60 and the spout 56. The dispensing action of this device is identical to that of the previously described embodiment. Thus, when the water level falls from its upper level 72 to its lower level 74 a small quantity of liquid within the container 50 is drawn through the orifice 62 into the elongated spout 58. By locating the open end 68 of the U-shaped tube 64 within the well 70 the arrangement assures that substantially the entire quantity of liquid within the container may be dispensed.

Figure 6:
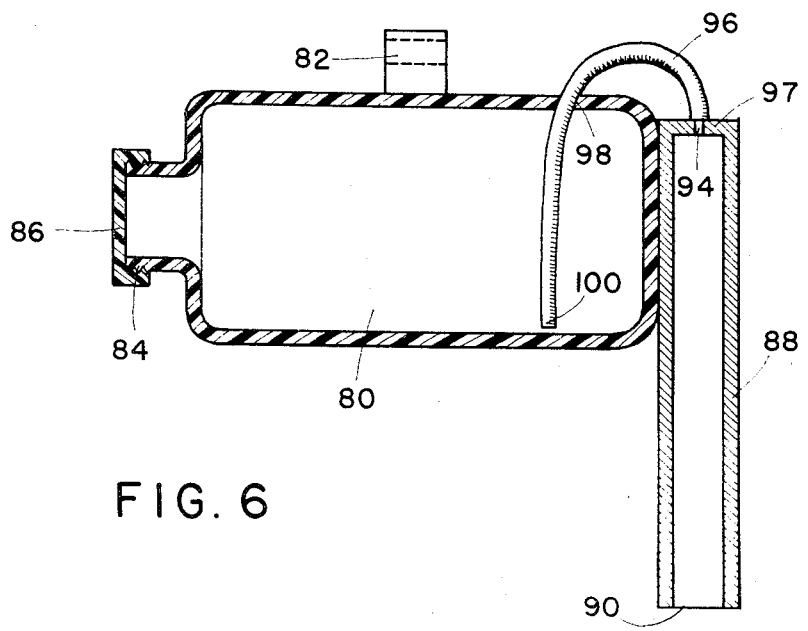
FIG. 6 is a sectional view of a third embodiment of the dispenser of the present invention.

A further modification of the invention is shown in FIG. 6 where the container 80 is provided with a suitable hook or other hanger 82 and has a threaded opening 84 which is sealed by a cap 86. An elongated tube 88 open at its lower end 90 and closed at its upper end 97 is positioned to extend vertically so that the lower end 90 is submerged when the water is at its upper level and uncovered when the water is at its lower level. A small diameter orifice 94 provided in the closed upper end 97 of the tube 88 communicates with a U-shaped tube 86 which extends through an opening 98 in the bottle 80 and has its lower end 100 positioned at the lowest point of the bottle. The tube 96 has a fluid-tight seal at the point 98 at which this tube passes through the wall of the bottle 80. The elongated tube 88 may be attached to the bottle 80 or may be carried separately from the bottle if desired. Again, the dispensing action is the same as that in the previously described embodiment, the small diameter orifice 94 determining the amount of liquid which will be drawn from within the container 80 as the water level drops from its upper to its lower level.

It will be understood that while only the best known embodiments of the invention have been illustrated and discribed in detail herein the invention is not limited thereto or thereby. Reference should therefore by had to the appended claims in determining the true scope of the invention.

What is claimed is:

1. Apparatus for dispensing a quantity of a first liquid into a second liquid, comprising:
   a container for the first liquid having an opening at its lowermost point;
   a tubular member extending vertically downwardly from the opening;
   a nozzle member received within the opening of the container and comprising the upper end of the tubular member, the nozzle member having a small diameter orifice extending therethrough;
   means for supporting the container and the tubular member whereby the lower end of the tubular member is at a point between a first, upper level and a second, lower level of the second liquid; and
   a tube within the container extending from the orifice of the nozzle member to a point closely adjacent the upper surface of the nozzle member and defining a passage through which the first liquid must pass before dispensing into the second liquid.

2. Apparatus according to claim 1 wherein the nozzle member has a well extending downwardly from the top surface of the nozzle member, the tube extending into the well.

3. Apparatus according to claim 1 wherein the nozzle has an upper portion and wherein the tube is defined by a first bore extending upwardly from the orifice and within the upper portion, a second bore extending substantially parallel to the first bore within the upper portion and having its lower end in communication with the interior of the container, and a cross bore connecting the upper ends of the first and second bores.

4. Apparatus according to claim 1 wherein the nozzle member, tubular member, and the tube comprise a single operative unit received within the opening of the container.

* * * * *